United States Patent
Nakamura et al.

[11] Patent Number: 5,106,575
[45] Date of Patent: Apr. 21, 1992

[54] NUCLEAR FUEL ASSEMBLIES

[75] Inventors: Shozo Nakamura, Hitachioota; Tadashi Mizuno, Kitaibaraki; Tetsuo Yasuda, Hitachi; Akira Maru, Toukai; Yoshishige Kawada, Hitachi; Yoshihiko Yanagi, Hitachi; Hiromasa Hirakawa, Hitachi; Junjiro Nakajima, Hitachi; Yasuhiro Aizawa, Hitachi; Yorihide Segawa, Hitachi, all of Japan

[73] Assignees: Hitachi, Ltd., Tokyo; Hitachi Engineering Co., Ltd., Ibaraki, both of Japan

[21] Appl. No.: 464,151

[22] Filed: Jan. 12, 1990

[30] Foreign Application Priority Data

Jan. 13, 1989 [JP]  Japan .................................. 1-4927
Apr. 26, 1989 [JP]  Japan .................................. 1-104463

[51] Int. Cl.⁵ .................................................. G21C 3/34
[52] U.S. Cl. ..................................... 376/439; 376/443; 376/444
[58] Field of Search ................ 376/409, 439, 443, 444

[56] References Cited

U.S. PATENT DOCUMENTS

| | | | |
|---|---|---|---|
| 4,035,233 | 7/1977 | Williamson | 376/409 |
| 4,560,532 | 12/1985 | Barry | 376/434 |
| 4,655,995 | 4/1987 | Freeman | 376/267 |
| 4,889,684 | 12/1989 | Johansson | 376/444 |

Primary Examiner—Donald P. Walsh
Attorney, Agent, or Firm—Antonelli, Terry, Stout & Kraus

[57] ABSTRACT

A nuclear fuel assembly has a plurality of fuel rods and a lower tie plate supporting their lower ends. Coolant apertures extending through the lower tie plate. A channel box surrounds the fuel rods and receives the lower tie plate, to confine the coolant. To restrict leakage of coolant between the tie plate and the channel box, the coolant apertures include, adjacent the periphery of the lower tie plate, a plurality of peripheral apertures which are located at least partly outside the outermost fuel rods. The peripheral apertures each provide a coolant velocity peak located further from the axial center line of the tie plate than the axial center lines of the closest neighboring fuel rods. The invention also provides venturis in the leakage path between the channel box and the tie plate, to restrict deformation of the tie plate.

15 Claims, 12 Drawing Sheets

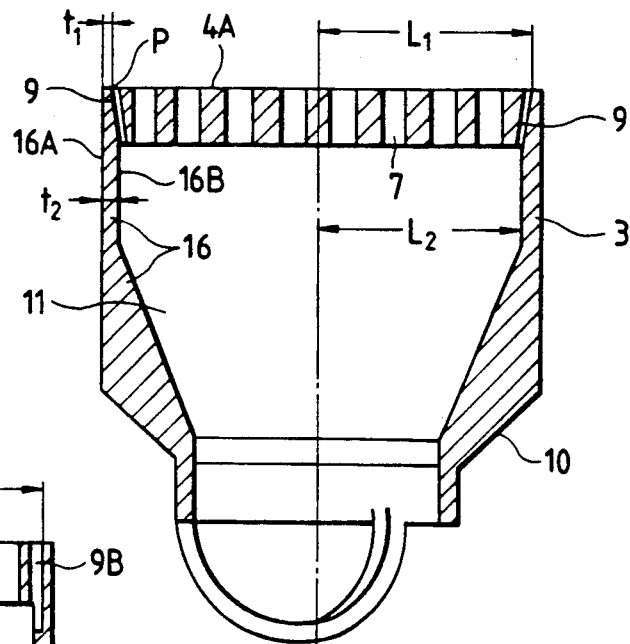
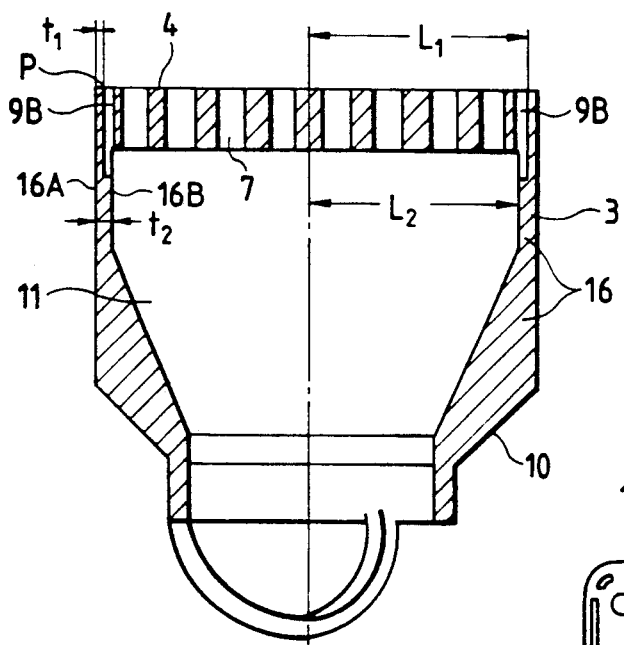
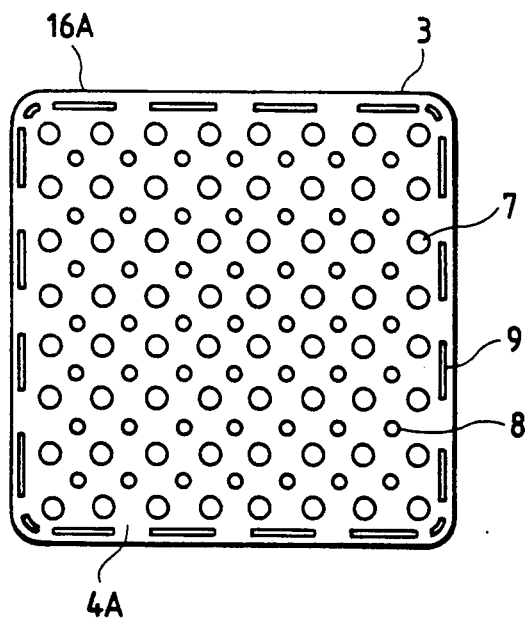

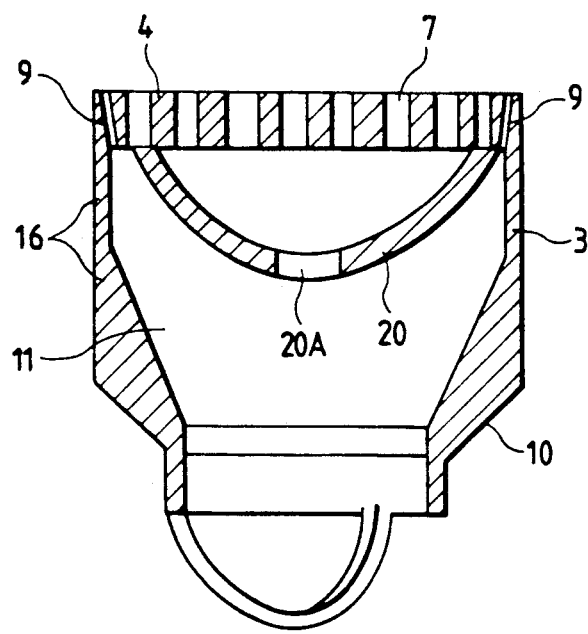
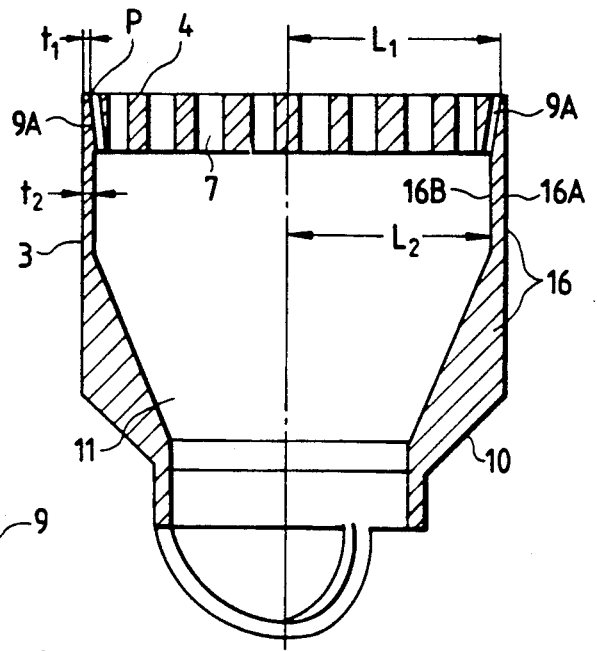
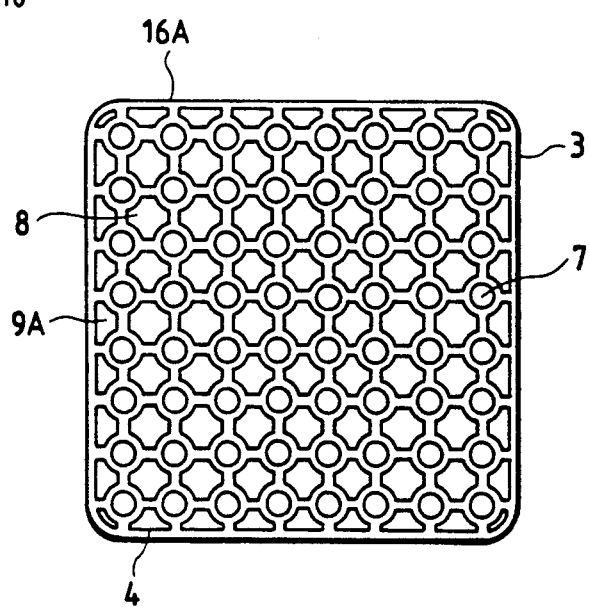

NUCLEAR FUEL ASSEMBLIES

BACKGROUND OF THE INVENTION

1. Field of the Invention

The present invention relates to nuclear fuel assemblies and, more particularly, to fuel assemblies suitable for boiling water reactors.

2. Description of the Prior Art

A known fuel assembly used for a boiling water reactor is provided with upper and lower tie plates, a plurality of fuel rods whose upper and lower ends are held by the upper and lower tie plates, respectively, and fuel spacers for maintaining the spacing between adjacent fuel rods, as described in Japanese Laid-Open Patent Application JP-A-60-120282. The bundle of fuel rods is inserted into a channel box, which is attached to the upper tie plate. The lower tie plate is slidably inserted into the lower end portion of the channel box. Finger springs are disposed between the channel box and the lower tie plate. The finger springs suppress the leakage of the coolant in the channel box to the outside via the gap between the channel box and the lower tie plate.

The finger spring of this conventional fuel assembly cannot completely prevent the coolant in the fuel assembly from leaking to the outside from the gap between the channel box and the lower tie plate. The conventional fuel assembly is therefore defective in that the amount of coolant leaking from the gap cannot be controlled.

There is a risk of breakage of the finger springs. Additionally, the present inventors have found that the pressure difference between the inside and outside of the channel box causes creep deformation which increases the leakage rate over the exposure time of the fuel rods.

The finger spring applies a force to the channel box that is directed outwardly. This force promotes creep deformation at the lower end portion of the channel box and expands the lower portion of the channel box outwardly.

Japanese Laid-Open Patent Application JP-A-61-170692 discloses a structure that does not use the finger spring. As is shown in FIG. 1 of this prior art reference, steps having an inward inclination are disposed around the outer peripheral portion of the lower tie plate and the channel box is placed on one step of this structure. The channel box is thus kept in close contact with the lower tie plate by its own weight and this restricts the leakage of cooling water. Since the channel box is placed on the steps having an inward inclination, inward components of force are caused to act on the lower end portion of the channel box and outward deformation of the outside of the lower end portion is reduced.

However, force still acts on the lower end portion of the channel box from inside to outside due to the pressure difference between the inside and outside of the channel box and this is likely to promote creep deformation. If the lower end portion of the channel box expands, the quantity of leaking cooling water increases.

SUMMARY OF THE INVENTION

It is an object of the present invention to provide a fuel assembly which is capable of reducing or controlling the leakage of coolant via the gap between the lower tie plate and the channel box.

It is another object of the present invention to provide a fuel assembly which is capable of reducing the creep deformation of the channel box.

In one aspect of the present invention, the lower tie plate is provided with coolant flow apertures situated at or close to the outermost periphery of its upper face of the tie plate so as to produce a flow pattern of the coolant which suppresses the leakage of the coolant from the gap between the channel box and the lower plate when the fuel assembly is loaded into the core of a reactor.

Particularly, the peripheral apertures are designed to increase the flow velocity near the channel box so as to reduce the static pressure. This reduces the leakage flow and the creep deformation at the lower end of the channel box.

The invention provides a plurality of peripheral coolant apertures in the lower tie plate which, as seen in plan view on the upper face of the lower tie plate, are at least partly located outside the lower ends of the outermost of the fuel rods.

The invention thus provides, adjacent the periphery of the lower tie plate, a plurality of peripheral coolant apertures which each provide a coolant velocity peak located further from the axial centre line of the tie plate than the axial centre lines of the closest neighbouring fuel rods to the aperture. Normally there are two closest neighbouring fuel rods to each peripheral aperture. This velocity peak is a peak in a diagram of coolant velocity distribution at the upper face of the lower tie plate along a line perpendicular to the direction of the periphery of the lower tie plate at the location of the aperture.

When the tie plate has an upper plate portion supporting said fuel rods and a side wall extending downwardly from the periphery of said upper plate portion and bounding a chamber for said coolant, the peripheral apertures are preferably at least partly located within the thickness of the side wall.

It can alternatively be stated that each of the peripheral apertures is bounded by a boundary wall which, at least at the upper face of the lower tie plate, has a portion more remote from the axial centre line of the lower tie plate than the inner face of the side wall bounding the coolant chamber.

In yet another statement of the invention, each of the peripheral apertures is bounded by a boundary wall which, at least at said upper face, has a portion which is spaced from the periphery of the lower tie plate by a distance which is less than the general thickness of said side wall bounding the coolant chamber.

The invention can also consist in, adjacent the periphery of the lower tie plate, a plurality of peripheral apertures which each has, at a region of the upper face of the lower tie plate further from the axial centre line of the tie plate than the axial centre lines of the closest neighbouring fuel rods to the aperture, a width in the direction parallel to the periphery of the lower tie plate which is greater than the width (if any) of the aperture in said direction at the region directly between said closest neighbouring fuel rods. In this way streams of coolant are provided close to the channel box.

In another aspect, according to the invention, the coolant apertures in the lower tie plate comprise a plurality of first apertures distributed, as seen in plan view on the upper face of the lower tie plate, in a first area spaced from the periphery of the upper face, and a plurality of second apertures smaller in cross-section than said first apertures and distributed in a second area surrounded by said first area. The sizes and spacings of the first and second apertures are such that the open area ratio of said first area is substantially larger than the open area ratio of said second area.

The open area ratio is the ratio of (i) the total cross-sectional area of all the coolant apertures (excluding any water rod apertures) at the upper face of the lower tie plate in said first area or said second area to (ii) the total surface area of said first arm or said second area.

In another aspect of the invention, there is a path for leakage flow between the channel box and said lower tie plate, and there are provided means for generating, from said leakage flow, a force acting on a portion of the channel box and directed towards the lower tie plate. This force generating means is at least one venturi portion of the leakage flow path. The or each venturi may be defined by an inner surface of the channel box and an outer surface of the lower tie plate opposed thereto. Preferably the inner surface of the channel box is a vertical and the outer surface of said lower tie plate comprises a vertical portion and a portion inclined to the vertical below said vertical portion.

BRIEF DESCRIPTION OF THE DRAWINGS

Embodiments of the invention will now be described by way of non-limitative example with reference to the accompanying drawings in which:

FIGS. 6, 7, 9, and 10 are vertical sectional views of other embodiments of the lower tie plate within the invention;

FIG. 8 is a plan view of the lower tie plate shown in FIG. 7;

FIG. 11 is a plan view of the lower tie plate shown in FIG. 10;

DESCRIPTION OF THE PREFERRED EMBODIMENTS

Figure 1:
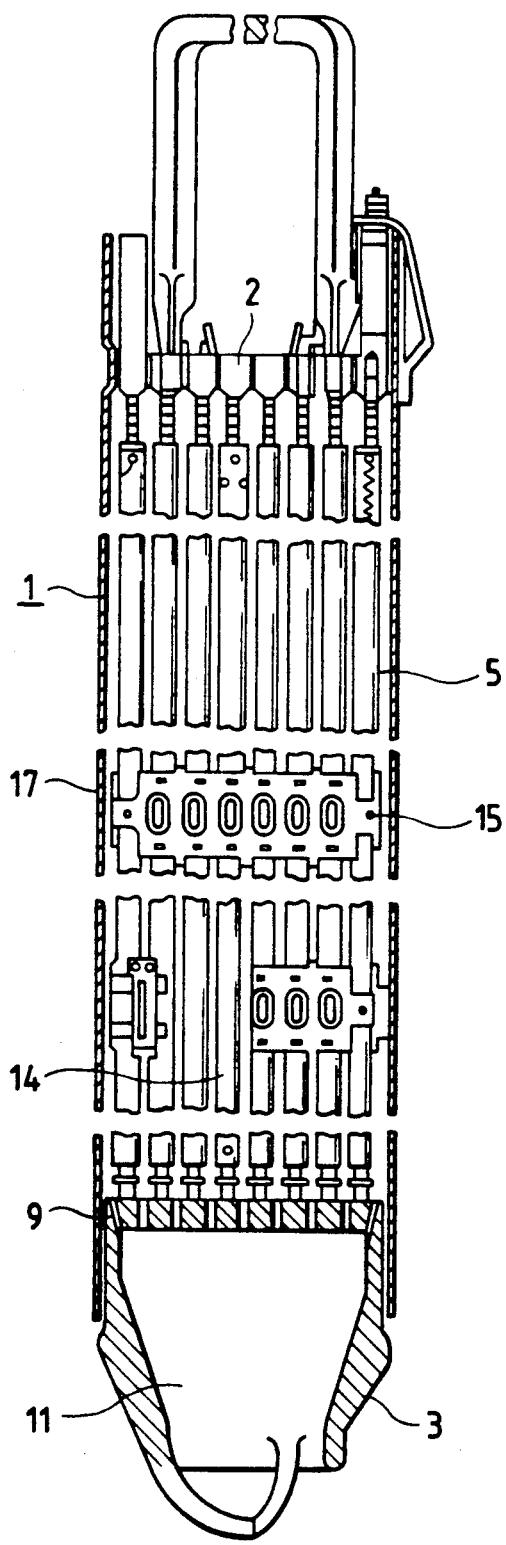
FIG. 1 is a general vertical sectional view of an embodiment of a fuel assembly according to the present invention.
Figure 2:
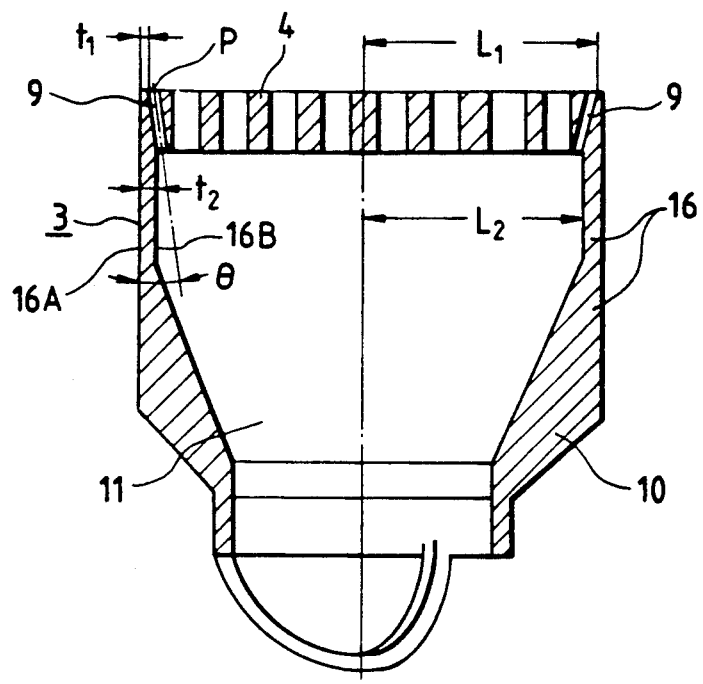
FIG. 2 is a detailed vertical sectional view on line II—II of FIG. 3 of the lower tie plate shown in FIG. 1.
Figure 3:
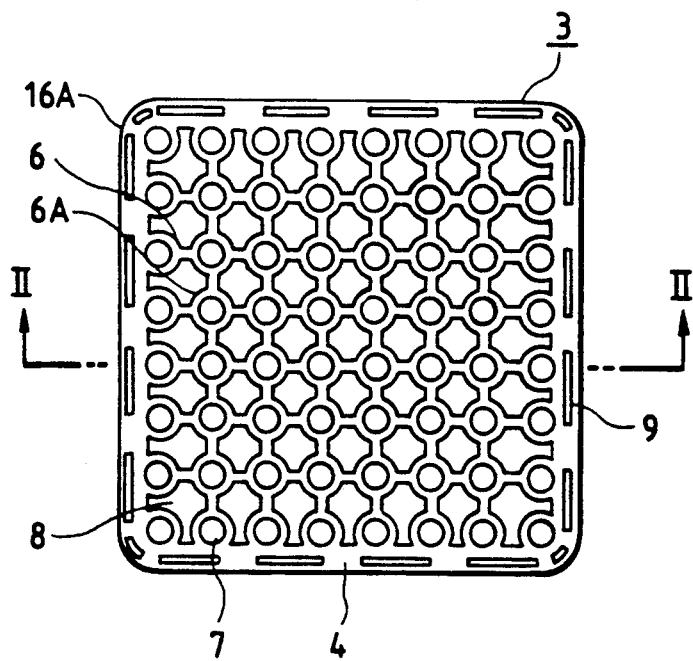
FIG. 3 is a plan view of the lower tie plate shown in FIG. 2.

The fuel assembly 1 of FIGS. 1, 2 and 3 is provided with a plurality of fuel rods 5 and an upper tie plate 2 and a lower tie plate for holding the upper and lower ends of the fuel rods 5. Some of the fuel rods 5 are coupling fuel rods and couple the upper tie plate 2 and the lower tie plate 3. A water rod 14 with its ends held by the upper tie plate 2 and the lower tie plate 3, respectively, is disposed among the fuel rods 5. Springs contacting the upper end plugs of the fuel rods 5 press the fuel rods 5 toward the lower tie plate 3. Fuel spacers 15 are disposed in the vertical direction of the fuel assembly 1 at predetermined intervals so as to hold the fuel rods 5 spaced apart. A channel box 17 is attached to the upper tie plate 2 so as to surround the bundle of the fuel rods 5. The upper portion of the lower tie plate 3 is inserted into the lower end portion of the channel box 17. The channel box 17 and the lower tie plate 3 are engaged with each other such that the lower end of the channel box 17 does not come off the lower tie plate 3 even if the upper tie plate 2 moves upward due to the thermal expansion or radiation deformation of the fuel rods 13 during the operation of a reactor loaded with the fuel assembly 1. This general arrangement of a fuel assembly is known and need not be described further.

Figure 4:
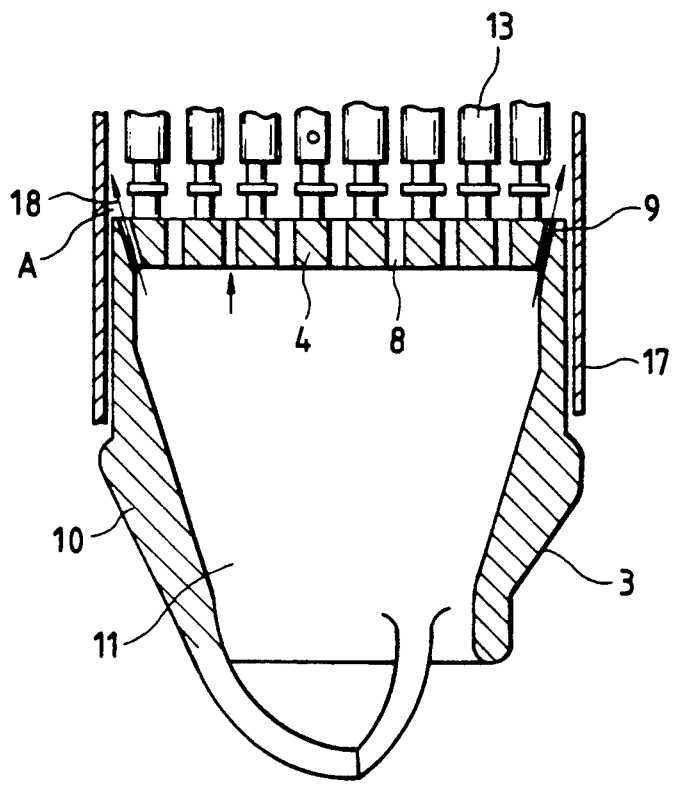
FIG. 4 is a sectional view of an alternative construction to that of FIG. 2 and showing the lower end of the channel box.

The structure of the lower tie plate 3 will be explained in detail with reference to FIGS. 2 and 3. The lower tie plate 3 is provided with a fuel supporting member 4 and a lower part 10. The lower part 10 is a part square and part conical body with a chamber 11 therewithin. The fuel supporting member 4 is attached to the upper end portion of the lower part 10 in such a manner as to cover the chamber 11. Typically the lower tie plate 3 is made in one piece, of suitable steel alloy. The fuel supporting member 4 is provided with a plurality of bosses 6A having holes 7 for receiving the lower end plugs of the fuel rods 5 or the water rod 14, and a multiplicity of ribs 6 connecting the adjacent bosses 6A. The outer wall of the bosses 6A and the ribs 6 constitute cooling water apertures or passages 8. The lower tie plate 3 is further provided with a plurality of peripheral cooling water apertures in the form of cooling water jet slits 9 in the vicinity of the four outer side surfaces 16A. The exits of the cooling water jet slits 9 are disposed between outermost holes 7 and the outer side surface 16A of the lower tie plate 3 parallel to the outer side surface 16A of the lower tie plate 3. Each cooling water jet slit 9 is a cooling water passage having a long and narrow rectangular cross-section and the exits of the cooling water jet also extend along the outer side surface 16A. Each of the cooling water jet slits 9 is formed such that the entrance communicates with the chamber 11 below the fuel supporting portion 4 and the exit is situated on the upper end surface of the lower tie plate 3. The center of the axis of the cooling water jet slit 9 is inclined at an angle of 0 with respect to the outer side surface 16A of the lower tie plate 3. In other words, the dimension between the center of the entrance of the cooling water jet slit 9 and the outer side surface 16A is larger than the dimension between the centre of the exit of the cooling water jet slit 9 and the outer side surface 16A of the lower tie plate 3. This means that the centre of the axis of the cooling water jet slit 9 is also inclined with respect to the inner surface of the channel box 17 as illustrated in FIG. 4.

In detail, the cooling water jet slit 9 has the following construction. The dimension $t_1$ between (i) the side wall portion P situated towards the outer side surface 16A of the tie plate 3, of the side walls of the cooling water jet slit 9 at the exit thereof, and (ii) the outer side surface 16A is smaller than the thickness $t_2$ of the side wall 16 of the lower tie plate 3. In fact the side wall portion P is situated closer to the outer side surface 16A than to the inner side surface 16B. It can also be said from another viewpoint that, the dimension $L_1$ between (i) the side wall portion P of the cooling water jet slit 9 situated towards the outer side surface 16A of the side surfaces of the cooling water jet slit 9 at the exit thereof, and (ii) the central axis of the lower tie plate 3 is larger than the dimension $L_2$ between the inner side surface 16B of the lower tie plate 3 and the central axis of the lower tie plate 3.

In this embodiment, no finger spring is provided between the lower tie plate 3 and the channel box 17, as shown in FIG. 1.

When the fuel assembly 1 is loaded into the core of a boiling water reactor, the cooling water flows into the chamber 11 formed in the lower part 10 of the lower tie plate 3 and is supplied between the fuel rods through the cooling water passages 8, 9. Part of the cooling water from the chamber 11 flows out of the cooling water jet slits 9 towards the channel box 17 in the direction of the arrows 18, as shown in FIG. 4. The flows from the cooling water jet slits 9 gather in the form of a belt in the vicinity of the lower tie plate 3 and proceeds towards the channel box 17. These flows 18 meet the inner surface of the channel box 17 and flow upward along the inner surface of the channel box 17.

Figure 5:
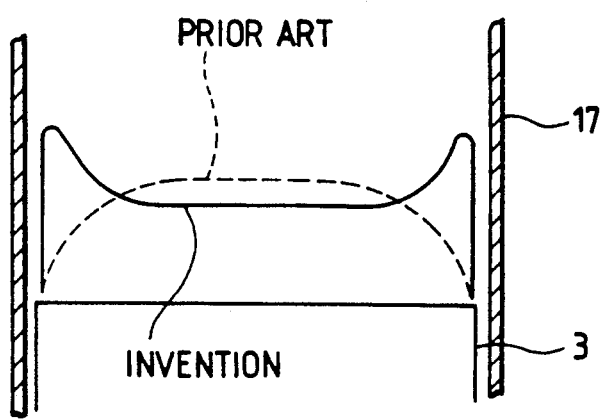
FIG. 5 is a diagram illustrating a velocity distribution of the rate of cooling water above and in the vicinity of the lower tie plate.

FIG. 5 shows an idealised velocity distribution of the flow rate of the cooling water above and in the vicinity of the lower tie plate 3. In a lower tie plate of the prior art having uniform size coolant apertures distributed uniformly of the lower tie plate, as indicated by the broken line the flow rate of cooling water increases towards the central region in the cross-section of the channel box 17. In contrast, the present invention in this aspect, the flow rate of cooling water is increased in the vicinity of the channel box 17, as indicated ideally by the solid line. Such an ideal is not likely to be achieved in practice, but the present embodiments provide velocity peaks in the flow distribution at the upper face of the lower tie plate adjacent the periphery thereof. Of course, higher in the channel box, the velocity diagram changes from that at the lower tie plate. In the present embodiments having such distribution of flow rate of cooling water, a relatively low-pressure area is formed in an area (represented by A in FIG. 4) in the vicinity of the inner surface of the channel box 17 as a result of the higher velocity from the cooling water jet slits 9. The leakage of cooling water from the channel box 17 through the gap between it and the lower tie plate is thus reduced. This action is caused due to the position of the exits of the cooling water jet slits 9 closer to the outer surface 16A than the outermost cooling water passages 8. Preferably, the exits of the cooling water jet slits 9 ar wholly outside of the centre lines of the outermost holes 7. Especially, it is preferable that the side wall portions P of the cooling water jet slits 9 are situated closer to the outer side surface 16A of the lower tie plate 3 than to the inner side surface 16B.

If the cooling water jet slit 9 is inclined at an angle of $\theta$ to such a degree as not to produce a downward component even if the jet flow 18 hits upon the channel box 17, it is possible to dispose the exit of the cooling water jet slit 9 on the portion on the side surface of the lower tie plate 3 which is covered with the channel box 17 without losing the abovedescribed function.

This embodiment can greatly suppress the leakage of the cooling water from the gap between the lower tie plate 3 and the channel box 17 due to the hydromechanical action of the flow jetted from the cooling water jet slits 9. This effect is achieved by a fuel assembly having a simple structure in which the cooling water jet slit 9 are provided without using a finger spring. Since the exit of the cooling water jet slit 9 extends along the outer side surface 16A, it is possible to form the area in which the flow rate of the cooling water increases in the vicinity of the channel box 17 over the entire periphery of the inner surface of the channel box 17. It is therefore possible to reduce the leakage of the cooling water from the gap formed between the lower tie plate 3 and the channel box 17 continuously along the entire periphery of the outer surface 16A of the lower tie plate 3.

The angle $\theta$ is preferably determined so as not to produce substantially any downward component even if the jet flow 18 hits the channel box 17. If the exit of the cooling water jet slit 9 is disposed in the vicinity of the outer side surface 16A of the lower tie plate 3 (for example, closer to the outer side surface 16A than the hole 7 which is disposed on the outermost periphery and the point thereof which is the closest to the outer side surface 16A) it is possible to have the structure in which the centre of the axis of the cooling water jet slit 9 may be parallel to the inner surface of the channel box 17 (namely, parallel to the outer side surface 16A) without losing the above-described function. FIG. 6 shows such a structure.

FIG. 6 shows a lower tie plate 3 which has the same structure as the lower tie plate described above except that the centre of the axes of the cooling water jet slits 9B are parallel to the outer side surface 16A of the lower tie plate. The exit of the cooling water jet slit 9B is situated closer to the outer side surface 16A of the lower tie plate 3 than the outer surface of the outermost fuel rods. In other words, the dimension $t_1$ between the side wall portion P of the cooling water jet slit 9B and the outer side surface 16A is smaller than the thickness $t_2$ of the side wall 16 of the lower tie plate, and the dimension $L_1$ between the side wall portion P of the cooling water jet slit 9B an the centre of the axis of the lower tie plate 3 is larger than the dimension $L_2$ between the inner side surface 16B of the lower tie plate 3 and the centre of the axis of the lower tie plate 3.

This embodiment achieves the same effect as the embodiment shown in FIG. 2. The shape of the lower ends of the apertures 9B in FIG. 6 is significant. To increase the flow size through the peripheral apertures 9B compared with the apertures 8, friction at entry to the apertures 9B should if possible be lower than at entry to the apertures 8. The design in FIG. 6 achieves this.

Another embodiment of a lower tie plate 3 is shown in FIGS. 7 and 8, where the central cooling water passages 8 have a smaller passage cross-section than in the embodiments of FIGS. 2, 4 and 6. The cross-section of the cooling water passages 8 is smaller than that of the fuel rod holes 7. Otherwise the structure and function of the lower tie plate 3 is substantially the same as in FIG. 2. The pressure loss of the fuel supporting member 4 in this embodiment is larger than in FIG. 2, so that the flow rate from the cooling water jet slits 9 is higher, i.e. the function of reducing the amount of cooling water leaking from the gap between the lower tie plate 3 and the channel box 17 is increased. In addition, the increase in the pressure loss of the fuel supporting member 4 leads to the amelioration of a phenomenon of unstable flow.

Still another embodiment of a lower tie plate will be explained with reference to FIG. 9. This lower tie plate 3 has a flow rate limiter, which is a resistor, on the lower surface of the fuel supporting member 4. The plan view of the lower tie plate is the same as that shown in FIG. 3. The flow rate limiter 20 has an opening 20A at the central portion thereof. The area of the opening 20A is smaller than the total passage area of the cooling water passages 8 which communicate with the chamber 11 below the flow rate limiter 20 through the opening 20A. This tie plate has the same function as that of FIG. 2.

Figure 12:
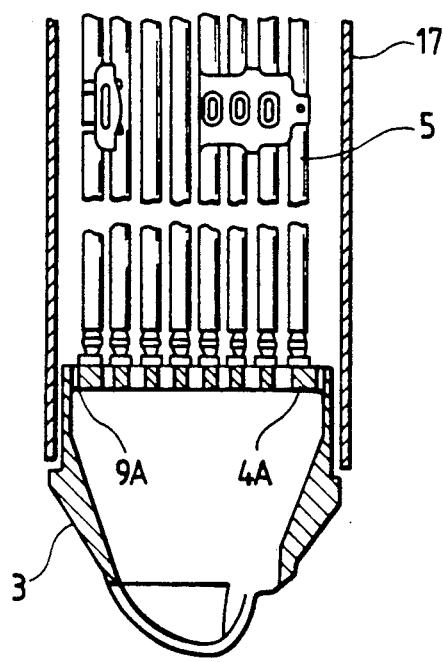
FIG. 12 is a vertical sectional view of the fuel assembly of FIGS. 10 and 11 on a smaller scale.

The lower tie plate of FIGS. 10 to 12 is provided with cooling water jet slits 9A each of which has a cross-section with a part thereof being the outer surface of the bosses holding the lower ends of the fuel rods. The cooling water jet slits 9A are disposed closer to the outer side surface 16A of the lower tie plate 3 than the outermost holes 7. In other words, in the lower tie plate 3, a part of the exit of the cooling water jet slit 9A is disposed between the outer side surface 16A and the hole 7. The widest point of the exit in the peripheral direction is outside the line joining the centre lines of the closest neighbouring holes 7. The fuel assembly shown in FIGS. 10 to 12 has the same function as the fuel assembly shown in FIG. 2.

Thus the leakage of a coolant from the gap between a lower tie plate and a channel box can be greatly reduced by a simple structure.

Figure 13:
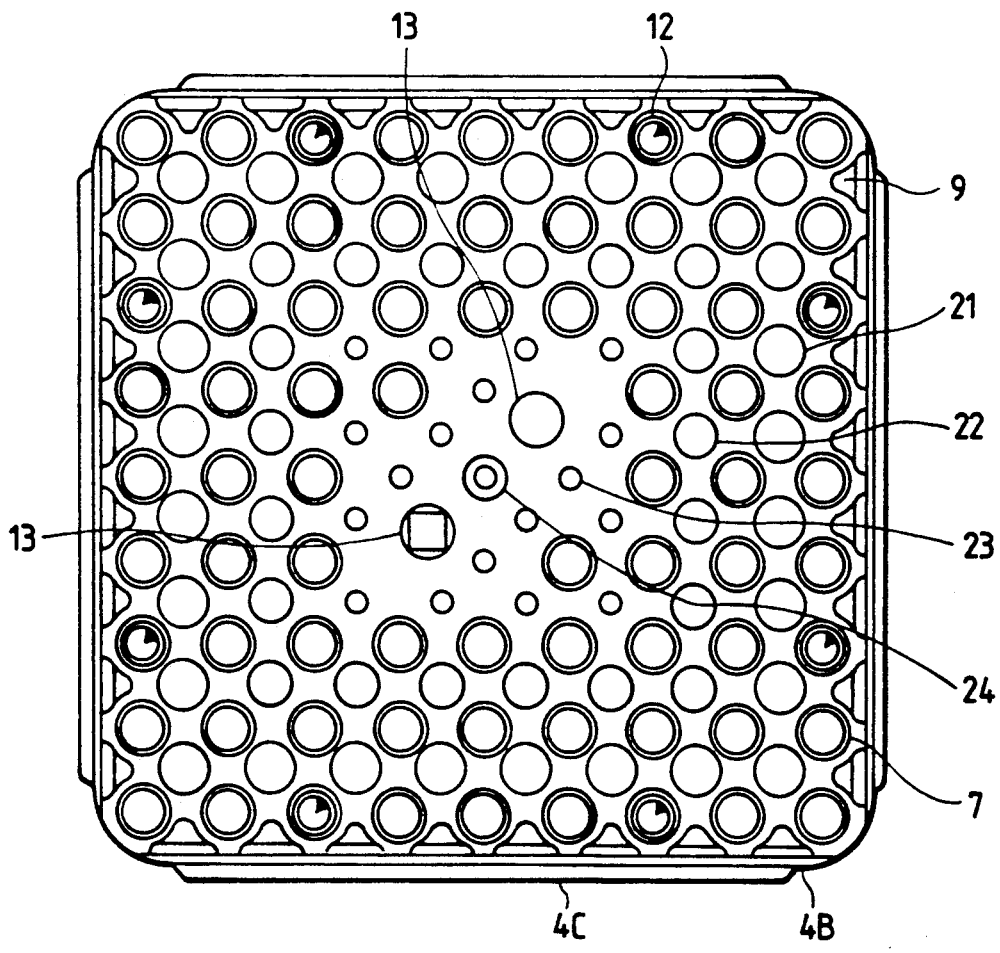
FIG. 13 is a plan view of a lower tie plate of a fuel assembly in accordance with yet another embodiment of the present invention.
Figure 14:
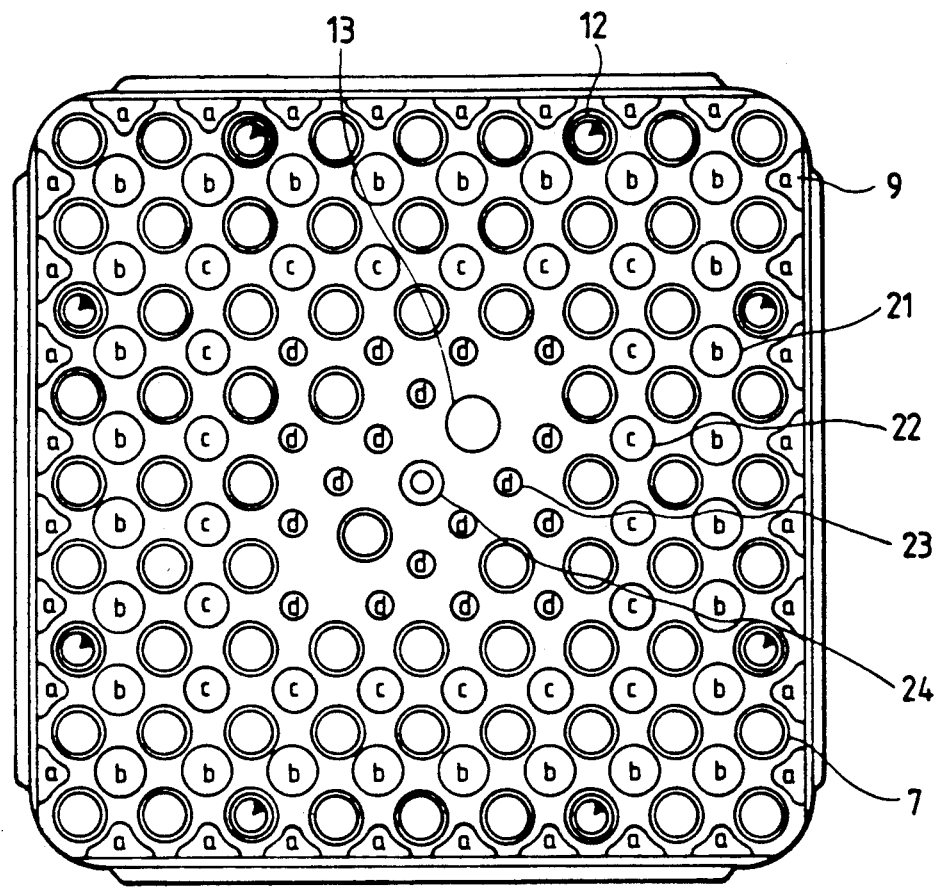
FIG. 14 shows each feed water port region of the lower tie plate shown in FIG. 13.

FIGS. 13 and 14 show in detail an example of the arrangement of the coolant apertures in accordance with the invention. In the tie plate there are peripheral apertures 9 of non-circular shape opening at the upper face outside the lines joining the centre lines of the outermost fuel rod holes 7. These apertures 9 are widest at their sides closest to the periphery. They are partially within the thickness of the wall 16 (as shown in FIG. 6) and the inner face of wall 16 can be seen in FIG. 13. The lower tie plate is shown in FIGS. 13 and 14 with screw-threaded holes 12 for the tie rods and two water rod holes 13. It has chambers 4B at its top edge and ledges 4C lower down. The circular coolant apertures 21, 22, 23 and 24 away from the periphery are of four different sizes, decreasing towards the centre, except that the single centre aperture 24 is larger for constructional reasons.

In this lower tie plate the total sectional area of the flow paths of the apertures 21 which are outermost (apart from the peripheral apertures 9) is larger and the total paths of the inner sets of apertures 22, 23 are smaller in order to further enhance the velocity distribution effect of the peripheral apertures 9 discussed above.

The distribution of the sectional areas of the flow path of the apertures 9, 21–24 is defined as shown in FIG. 14. The sectional area of the flow path of each peripheral aperture 9 is a, the sectional area of the flow path of each aperture 21 is b, the sectional area of the flow path of each aperture 22 further inside is c, the sectional area of the flow path of each aperture 23 yet further inside is d and the sectional area of the flow path of the aperture 24 at the centre is e. Then, the sum of the sectional areas of the flow paths in each aperture region is expressed by the following formula:

$$A = \sum_{i=1}^{n_a} a_i \qquad B = \sum_{i=1}^{n_b} b_i \qquad C = \sum_{i=1}^{n_c} c_i$$

$$D = \sum_{i=1}^{n_d} d_i \qquad E = e$$

The preferred proportion of the flow path area to the total flow path area in each of these regions is given in % in Table 1. The total flow path section area A of the peripheral apertures 9 is made as great as possible and is preferably 25 to 35%, and the total flow path sectional area of the apertures 21, too, is made as great as possible and is preferably 40 to 50%. The apertures closer to the centre are smaller. The total flow path sectional area of the apertures 22 is preferably 15 and 25%, the total flow path sectional area of the apertures 23 is preferably 2 to 10% and the total flow path sectional area of the feed water port 24 is preferably 0 to 5%.

As a definite example, an example of a 9 by a 9 fuel assembly is shown in Table 2. As shown in this table, the proportion of the total flow path sectional area of each region satisfies the range set forth in Table 1. The diameters of the apertures in each region is given just an example and is not limitative.

Since the apertures 21–24 are for the most part uniformly spaced apart, the open area ratio as defined above is greater at the region of the apertures 21 than at the region of the apertures 22 and is smallest at the region of the central apertures 23, 24.

Figure 15:
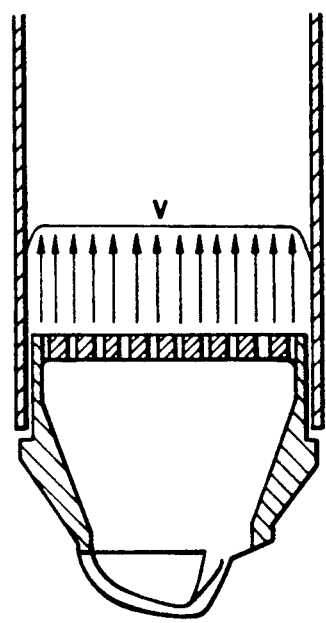
FIG. 15 is a diagrammatic indication of a flow velocity distribution inside a channel box when a lower tie plate in accordance with the present invention is

The flow velocity distribution inside the fuel assembly after leaving the lower tie plate is ideally made flat as shown in FIG. 15 by increasing the flow path sectional area of the apertures at the outer peripheral portions of the lower tie plate and reducing the flow path sectional area of the apertures close to the centre.

TABLE 1

| feed water port region | A | B | C | D | E |
|---|---|---|---|---|---|
| proportion of flow path area of feed water port (%) | 25 ~ 35 | 40 ~ 50 | 15 ~ 25 | 2 ~ 10 | 0 ~ 5 |

By reason of the velocity distribution achieved by the construction of FIGS. 13 and 14, the pressure difference between inside and outside the channel box is reduced and the leakage from inside to outside the channel box can be restricted, compared with an arrangement of uniform apertures.

The present construction provides another effect that the flow velocity distribution inside the channel box can be made more uniform than the conventional lower tie plate. Furthermore, the reduced static pressure adjacent the lower part of the channel box means that the outward creep deformation of the channel box is also reduced.

The embodiments of FIGS. 16 to 25 exhibit venturis between the channel box and the lower tie plate. The fuel assembly 1 is otherwise of the general type illustrated above. Thus the channel box 17 has a generally rectangular cross-section and is fitted to corner posts at the upper tie plate by cap screws disposed on a channel fastener. The lower end of the channel box 17 is a free end slidably receiving the lower tie plate 3. The channel box 17 surrounds the bundle of fuel rods 5.

Figure 17A:
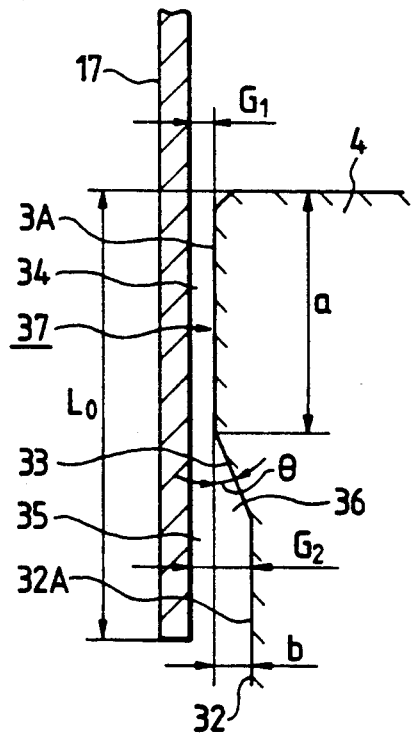
FIG. 17A is a longitudinal sectional view of the portions near the lower tie plate before the fuel assembly of FIG. 16 is loaded to a core.

Recesses 32 having a depth b are defined on the four outer side surfaces 3A of the lower tie plate 3. Each recess 32 is rectangular and opens outward. The upper region of the recess 32 is a slope 33 inclined at an angle $\theta$ to the vertical as shown in FIG. 17(A). The upper end of the slope 13 is spaced by a distance a from the upper surface of the upper part 4 of the lower tie plate. A gap 34 having a width $G_1$ and a gap 35 having a width $G_2$ are defined between the lower tie plate and the inner surface of the channel box 17 as shown in FIG. 17(A). In other words, the gap 34 is defined between the outer side surface 3A of the lower tie plate and the inner surface of the channel box 17. The gap 35 is defined between the bottom surface 32A of the recess 32 and the inner surface of the channel box 17. The slope 33 and the bottom surface 32A are part of the side surface 3A. The gap 34 is positioned above the gap 35 and opens directly to the coolant passage within the channel box. Since the slope 33 is positioned between the gaps 34 and 35, a gap 36 whose cross-section area increases progressively downward is defined between the gaps 34 and 35.

Cooling water is supplied into the fuel assembly loaded in the core of the boiling water reactor. This cooling water is led into the channel box 17 through the apertures in the lower tie plate 3. The major portion of cooling water rises inside the channel box 17 and flows out upwardly from the upper tie plate 2. Part of cooling water leaks to outside the fuel assembly through the gaps 34, 36 and 35.

In the cooling water leakage passage 37 (inclusive of the gaps 34, 35 and 36) defined by the side surface 3A of the lower tie plate and the inner surface of the channel box 17, the flow path sectional area is small at the portion 34 of the gap, gradually increases at the portion 36 of the gap towards the portion 35 of the gap and becomes large at the portion 35. The flow path area is large above the portion 34 of the gap. Accordingly, the side surface 3A, the slope 33 and the bottom surface 32A and the inner surface of the channel box 8 opposing them are venturi means in the cooling water leakage passage 37.

Figure 18:
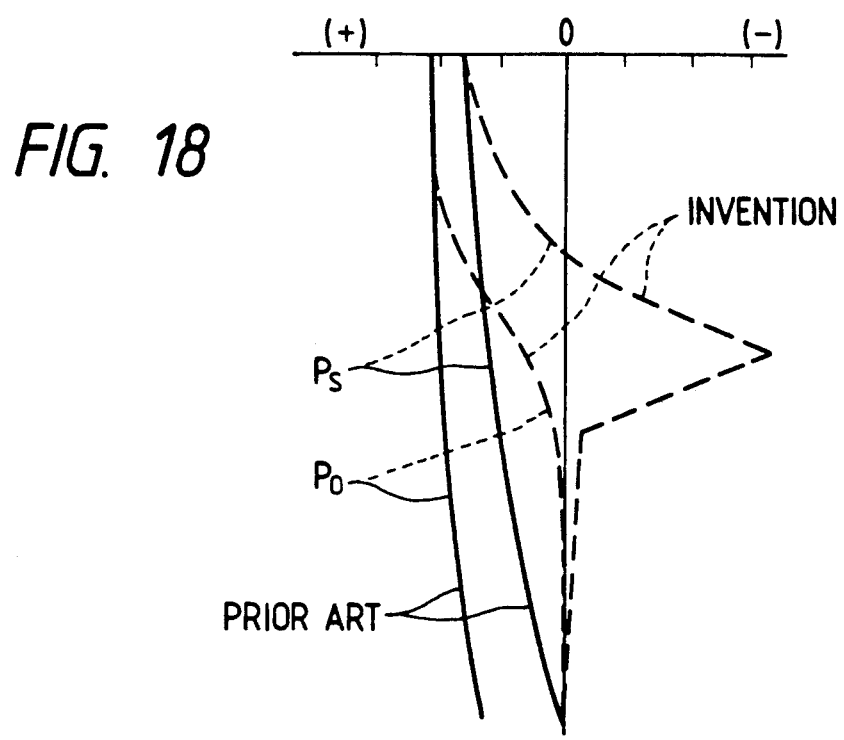
FIG. 18 is a diagram showing the pressure distribution variation downwardly from the upper end of the lower tie plate in the embodiment of FIG. 16.

Cooling water attains a high velocity at the portion 34 of the gap having a small flow area and the static pressure is lower than that in the channel box above the lower tie plate. Particularly, the static pressure becomes minimum at the lower end of the gap 34 (that is, the start point of the slope 33). Consequently, the internal pressure $P_1$ of the channel box 17 becomes lower than its outer pressure $P_2$ in the portion 34 and the pressure difference $\Delta P(P_1-P_2)$ becomes negative. In other words, a force that acts inwardly on the channel box 17 is generated. The pressure recovers gradually at the portion 36 of the gap and the pressure difference between the internal and external pressures of the channel box 17 becomes zero at the portion 35. FIG. 18 illustrates this and is described below. When the pressure difference $\Delta P$ becomes negative, the channel box 17 is pushed towards the side surface 3A of the lower tie plate. Accordingly, outward deformation at the lower end portion of the channel box 8 is remarkably restricted and its amount of creep deformation drops. The width $G_1$ and $G_2$ of the gaps 14 and 15 can be kept substantially constant from the initial stage of the operation cycle to its final stage.

Figure 17B:
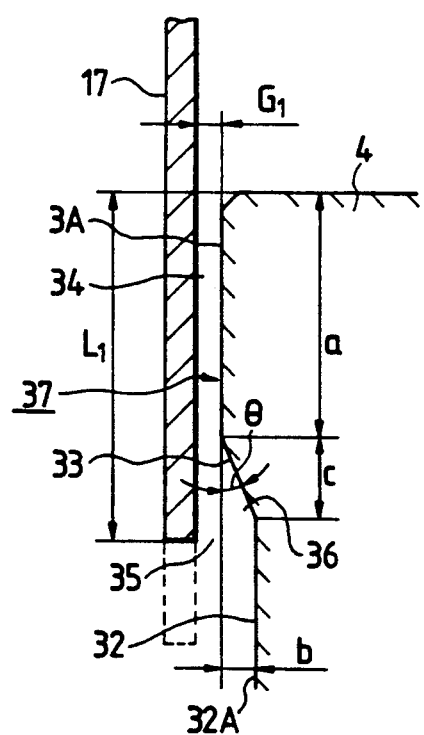
FIG. 17B is a longitudinal sectional view of the portions near the lower tie plate of the embodiment of FIG. 16 during the operation of the reactor.

FIG. 17(A) shows the fuel assembly after its production but before its loading into the core (the state under a burn-up rate of 0 kwd/t), and FIG. 17(B) shows the state of the fuel assembly during the operation of the reactor. When the operation of the reactor is stopped, the fuel assembly is in the state shown in FIG. 17(A). Before loading to the core, the overlap length $L_o$ of the channel box and the side surface of the lower tie plate is long. During the operation of the reactor, however, each fuel rod 5 expands in the axial direction due to its thermal expansion and lifts up the upper tie plate 2 so that the channel box 8, too, moves up. Therefore, the overlap length $L_1$ of the channel box with the side surface of the lower tie plate becomes shorter than the length $L_o$ during operation of the reactor. The length $L_1$ must be determined so that the lower end of the channel box extends to a position facing the bottom surface 32A of the recess 32 during the operation of the reactor. In other words, the relation $(L_1 > a+c)$ must be satisfied. Here, c represents the height of the slope 33 in the axial direction of the lower tie plate. In a new fuel assembly before loading to the core, the length $L_o$ is set so as to obtain the length $L_1$.

The pressure difference $\Delta P$ of the negative pressure described above can be obtained by utilizing the venturi effect expressed by the formula (1):

$$P_s = P_o - \rho v^2/2g \qquad (1)$$

where $P_o$: total pressure of cooling water flowing inside cooling water passage 17,

TABLE 1

| feed water port region | A | B | C | D | E |
|---|---|---|---|---|---|
| proportion of flow path area of feed water port (%) | 25 ~ 35 | 40 ~ 50 | 15 ~ 25 | 2 ~ 10 | 0 ~ 5 |

TABLE 2

| region | feed water diameter (mm) | number of feed water ports | total flow path sectional area of each region | proportion of total flow path sectional area (%) |
|---|---|---|---|---|
| A | — | 32 | 960 | 29.8 |
| B | b = φ8.0 | 28 | 1407 | 43.7 |
| C | c = φ6.5 | 20 | 664 | 20.6 |
| D | d = φ3.3 | 18 | 152 | 4.7 |
| E | e = φ7.0 | 1 | 39 | 1.2 |

$P_s$: static pressure of cooling water,
$\rho v^2/2g$: dynamic pressure of cooling water.

Figure 19:
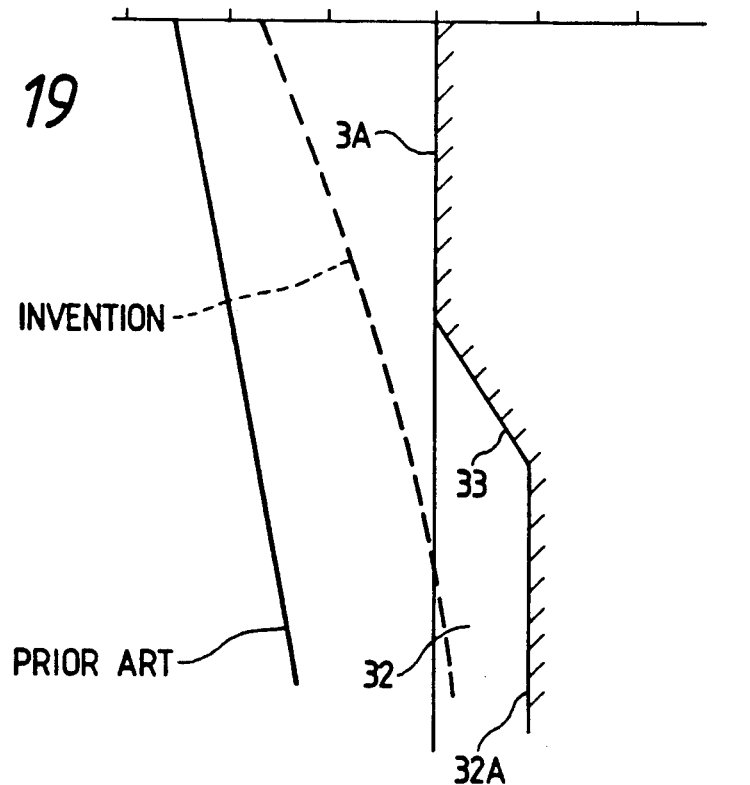
FIG. 19 is a diagram showing the distribution of a deformation of the channel box downwardly from the upper end of the lower tie plate in the embodiment of FIG. 16.

FIGS. 18 and 19 illustrate the effects of the venturi means described above, and shows the total pressure $P_o$ inside the cooling water passage 37 at the position below the upper face of the lower tie plate, its static pressure $P_s$ and FIG. 19 shows the deformation of the channel box. In FIG. 18, the broken lines represent the characteristics of the embodiment shown in FIG. 17. The solid lines represent the characteristics of the conventional fuel assembly which is not equipped with the recesses 32 on the outer side surface and has a straight side surface 3A overlapping with the channel box 17. The ordinate in FIGS. 18 and 19 represents the distance from the upper face of the lower tie plate.

As shown in FIG. 18, in the conventional example, the force that causes outward deformation of the channel box (the static pressure $P_s$ having a positive value) acts on the portion of the channel box 17 below the upper end of the lower tie plate. In the present embodiment, however, the force that pushes the channel box towards the lower tie plate becomes greater than the force that pushes the channel box outwardly due to the function of the venturi means as shown in FIG. 18. Therefore, the outward deformation quantity of the channel box becomes smaller than that of the conventional example, as shown in FIG. 19.

Figure 20:
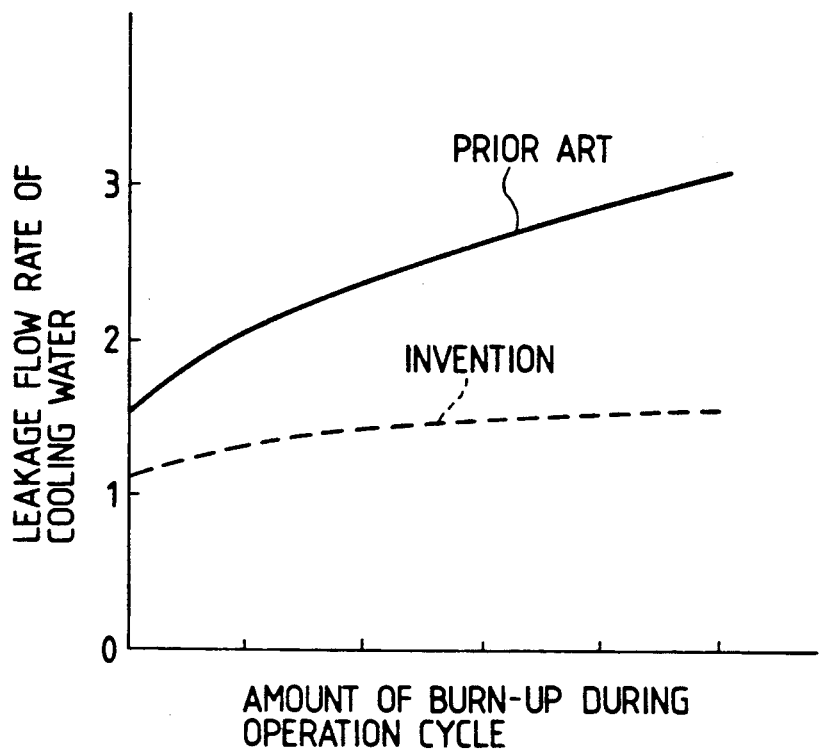
FIG. 20 is a diagram showing the variation of a cooling water leakage flow rate with amount of burn-up during the operation cycle in the embodiment of FIG. 16.

During the operation of the reactor, the outward pressure from inside always acts on the channel box due to the static pressure of cooling water inside the channel box above the lower tie plate. Therefore, the channel box undergoes outward creep deformation. In the conventional example, this creep deformation of the channel box causes increase in the flow rate of leaking cooling water (the leakage flow rate of cooling water) between the lower tie plate and the channel box with the increase in the burn-up rate, as represented by solid line in FIG. 20. In this embodiment, however, since a force that pushes the channel box towards the lower tie plate is generated as described above, the increase in size due to the creep deformation of the channel box can be reduced. In this embodiment, therefore, the leakage flow rate of cooling water does not much change with the increase in the burn-up rate as shown in FIG. 20. In this manner this embodiment can keep the leakage flow rate of cooling water more constant throughout the operation cycle. This results in higher stabilization of thermal output of the fuel assembly. The construction of the venturi is simple.

In this embodiment, the following is preferably taken into consideration in order to achieve more effectively the function of the venturi means.

$a/L_o$ preferably satisfies the following condition in the new fuel assembly before loading into the core:

$$0.3 \leq a/L_o < \alpha \qquad (2)$$

Here, $\alpha$ is a limit value which is set so that even when the lower end of the channel box moves up due to the increase in the burn-up as shown in FIG. 17(B), the lower end of the slope 33 does not become below the lower end of the channel box. This limit value depends on the set condition of the burn-up rate of the fuel assembly. When the lower end of the slope 33 is positioned below the channel box, the venturi effect by the venturi means cannot be obtained. In such a case, the leakage flow rate of cooling water may increase drastically.

If the distance a is increased, frictional pressure loss between the channel box and the lower tie plate increases and restricts the increase of the leakage flow rate of the coolant. However, if the start point (upper end) of the slope 33 approaches the lower end of the channel box, the negative pressure of the pressure difference P capable of restricting outward deformation of the channel box and the zero pressure region come closer to the lower end of the channel box and creep deformation of the channel box becomes greater than when the distance a is small.

Figure 21:
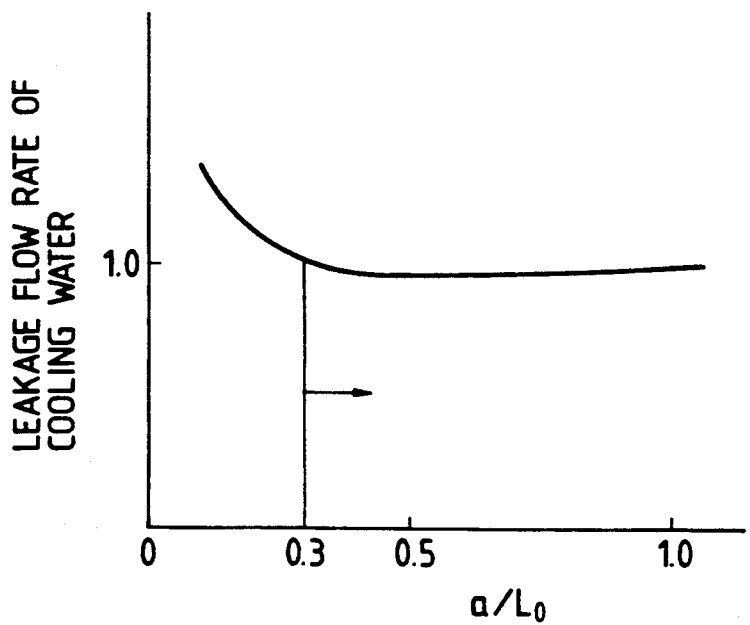
FIG. 21 is a diagram showing the relation between $a/L_o$ and the cooling water leakage flow rate in the embodiment of FIG. 16.

FIG. 21 shows the dependence of the leakage flow rate of cooling water on the distance a when creep deformation of the channel box is considered. The leakage flow rate of cooling water becomes remarkably small in the region of $a/L_o \geq 0.3$ from the characteristics shown in FIG. 21. It is therefore preferred that the relation $a/L_o \geq 0.3$ be satisfied. Particularly, the relation $a/L_o \leq 0.6$ is most preferably satisfied because the leakage flow rate of cooling water becomes small at $a/L_o \geq 0.6$.

The angle $\theta$ of the slope 13 is preferably from 5° to 6°. If the angle $\theta$ is within the range of 5° to 6°, the pressure loss at the portion of the gap 36 (the portion where the slope 33 is positioned) becomes minimal. Therefore, the venturi effect can be exhibited most fully.

The depth b is preferably within the range of 1 to 2 mm. The depth b of the recess 12 must be determined so that the pressure difference $\Delta P$ which becomes a negative pressure at the portion 34 can recover to zero. In other words, the dynamic pressure $\rho v^2/2g$ must be made substantially zero at the portion 35 of the gap. For this reason, the depth b must be at least 1 mm. If the depth b is made great, however, the thickness of the side wall of the lower tie plate 4 becomes small and a problem of reduced strength may arise. In view of this problem, the depth b is suitably within the range of 1 to 2 mm.

Figure 16:
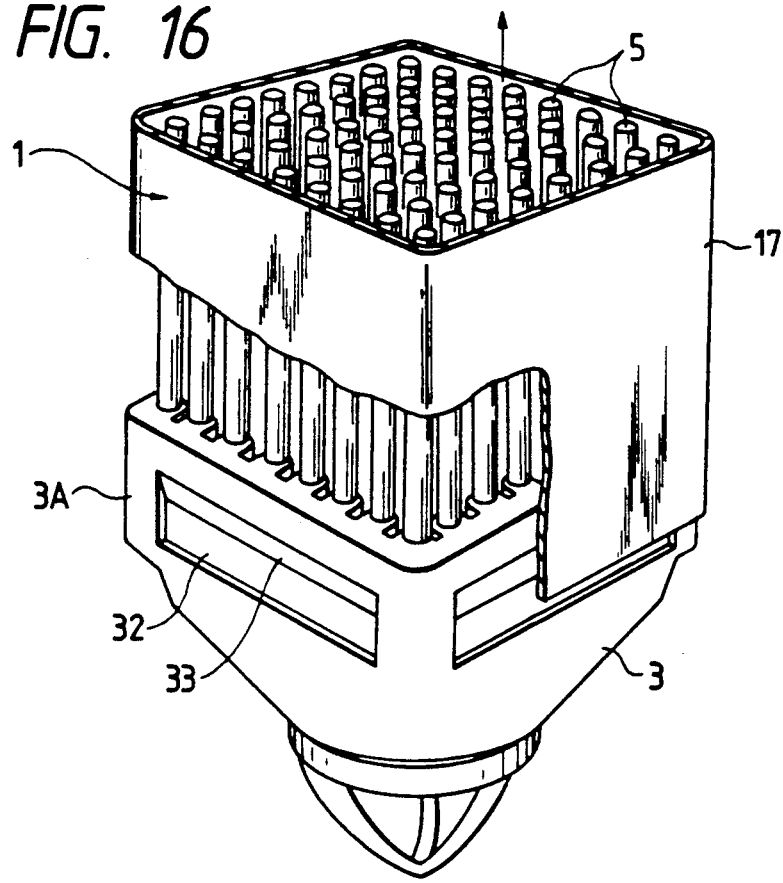
FIG. 16 is a perspective view of portions of a nuclear fuel assembly including a lower tie plate in a further embodiment of the invention which includes venturi devices.
Figure 22:
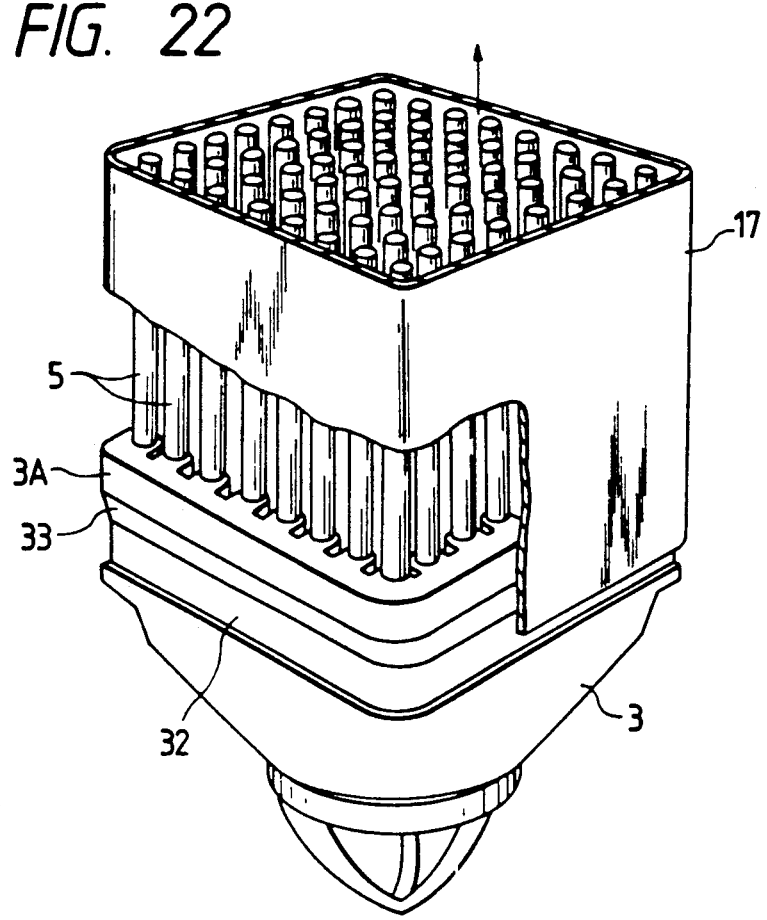
FIG. 22 is a perspective view of portions near the lower tie plate of the fuel assembly in another embodiment of the present invention including a venturi.

FIG. 22 shows part of a fuel assembly in accordance with another embodiment of the present invention, in which the structure of the lower tie plate is different from that of FIG. 16. The lower tie plate 3 in this embodiment has a step portion 32 on the side surface 4A in place of the recesses of FIG. 16. This step portion 32 is formed by extending continuously the recess of FIG. 16 around the entire periphery of the side surface of the lower tie plate. The step portion 32 and the top of the side surface 3A are smoothly joined through a slope 33. A venturi extending all around the lower tie plate is thus formed and gives the sam effect as FIGS. 16 and 17. Machining of the side surface of the lower tie plate is easier in this embodiment.

Figure 23:
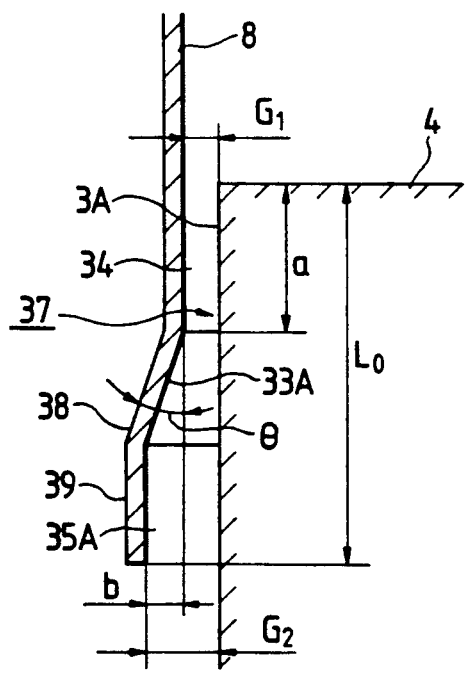
FIG. 23 is a longitudinal sectional view of the portions near the lower tie plate of the fuel assembly in still another embodiment of the present invention including a venturi.

FIG. 23 shows yet another embodiment and corresponds to FIG. 17(A). The fuel assembly in this embodiment is the same as that of FIGS. 16 and 17 except for the structures of the channel box and lower tie plate. The lower tie plate does not have the recesses 32 on its side surface, but the venturi means in this embodiment is constituted by arranging surfaces corresponding to the recesses 32 on the channel box 17. In other words, a projection 39 projecting outward is formed at the lower end portion of the channel box 17. The projection 39 has a rectangular cross-section in the same way as the main body portion of the channel box. The main body portion and the projection 39 are joined by a sloping portion 38. The inner surface of the projection 39 is positioned more outwardly by the depth b than the inner surface of the main body portion. The slope 33A inclined at an angle $\theta$ is formed inside the sloping portion 38.

This embodiment, too, has the cooling water leakage passage 37, including the gap 34 having the width $G_1$, the gap 35A having the gap $G_2$ and the widening gap at the region of the slope 33A, between the lower tie plate 4 and the channel box 8A. This embodiment thus also includes venturi means in the cooling water passage 37 which has the same effect as the venturis in FIG. 16. However, the production process for producing the venturi means, or in other words, machining of the lower end portion of the channel box is more difficult than machining of the recesses 32.

FIG. 23 shows the structure of a new fuel assembly 1C before it is loaded into the core. In this embodiment the values $a/L_o$, $\theta$ and b are preferably set in the same way as those in the fuel assembly of FIGS. 16 and 17.

Figure 24:
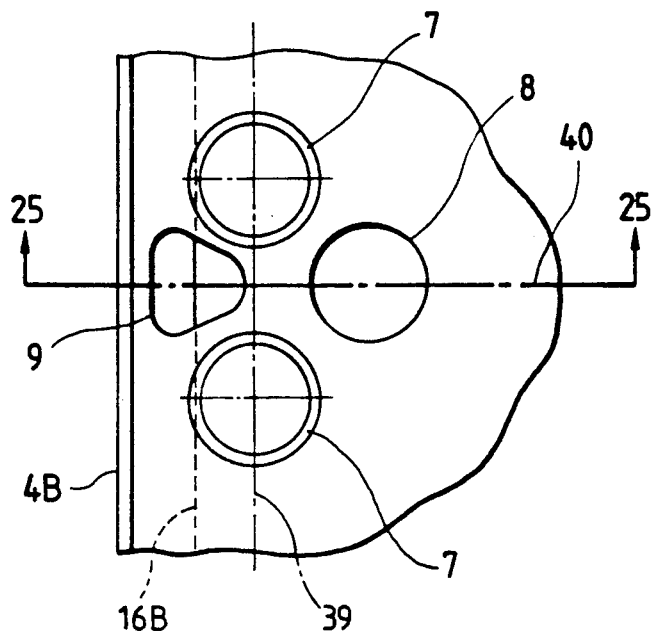
FIG. 24 is a plan view of a portion of the lower tie plate in another embodiment of the invention.
Figure 25:
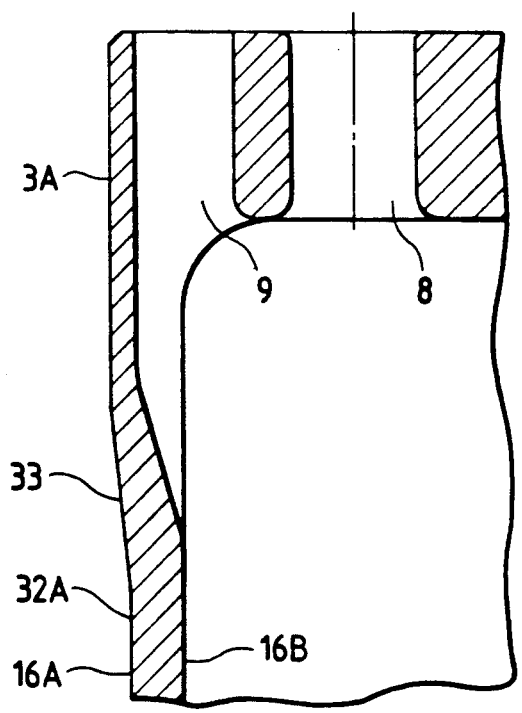
FIG. 25 is a sectional view on the line 25—25 of FIG. 24.

FIGS. 24 and 25 illustrate part of a lower tie plate of the invention combining the peripheral coolant flow apertures 9 of FIGS. 1 to 15 with the venturi of FIGS. 16 to 23. The peripheral apertures 9 are non-circular and are located as seen in FIG. 24 wholly outside the centre lines of the two closest neighbouring fuel rod holes. They lie partially in the thickness of the wall 16. The inside surface 16B of the wall 16 has a sloping groove at the entrance to the aperture 9 to reduce friction, compared with the relatively sharp-cornered entrances to the inner apertures 8. The venturi-forming surfaces 33,32A are provided on the outside face 3A of the lower tie plate as in FIG. 16.

Use of the fuel assemblies here described in the core of a boiling water reactor will be briefly explained. The core is disposed inside a pressure containment vessel of the reactor, and is formed by loading a large number of the fuel assemblies. The lower tie plate of each fuel assembly is supported by a fuel support grid disposed on the lower core support plate. One fuel support grid supports four fuel assemblies. The control rods can be inserted between the adjacent fuel assemblies through the fuel support grid. Cooling water is passed into the reactor pressure containment vessel and flows through the core. Cooling water that is supplied by the operation of a recirculation pump passes through a passage in the fuel support grid and is supplied from the lower tie plate into the fuel assembly. The major portion of water passes through the channel box and flows out from the top of the fuel assembly as described already. Part of cooling water leaks outward from the bottom of the channel box passage and rises in the gaps defined between the adjacent fuel assemblies.

The present invention can remarkably restrict deformation of the channel box by simple structures using the coolant itself.

What is claimed is:

1. Nuclear fuel assembly comprising;
    (a) a plurality of fuel rods having upper and lower ends and extending generally parallel to each other,
    (b) a lower tie plate supporting said lower ends of said fuel rods and having an upper part with an upper face and a plurality of coolant apertures extending through said upper part and ending at said upper face, and a lower part with a side wall extending downwardly from the periphery of said upper part, said coolant apertures each allowing coolant bounded by said side wall to pass through said upper part of said lower tie plate,
    (c) a channel box surrounding said fuel rods and having a lower end in which said lower tie plate is received, whereby in sue coolant after passing through said coolant apertures moves upwardly along said fuel rods within said channel box,
    wherein said coolant apertures include, adjacent the periphery of the lower tie plate, a plurality of peripheral apertures which each provide a velocity peak of coolant flow located further from the axial centre line of the lower tie plate than the axial centre lines of the closest neighbouring fuel rods to the aperture, said velocity peak being a peak in a diagram of coolant velocity distribution at the upper face of the lower tie plate along a line perpendicular to the direction of the periphery of the lower tie plate at the location of the aperture.

2. Nuclear fuel assembly according to claim 1 wherein said upper part is an upper plate portion supporting said fuel rods and providing said upper face, said side wall bounding a chamber for said coolant, said coolant apertures extending from said chamber to said upper face, and said peripheral apertures being at least partly located within the thickness of said wall.

3. Nuclear fuel assembly according to claim 1 wherein said channel box is supported at its upper end and slidably receives said lower tie plate.

4. Nuclear fuel assembly comprising:
    (a) a plurality of fuel rods having upper and lower end and extending generally parallel to each other,
    (b) a lower tie plate supporting said lower ends of said fuel rods and having an upper part with an upper face and a plurality of coolant apertures extending through said upper part and ending at said upper face, and a lower part with a side wall extending downwardly from the periphery of said upper part, said coolant apertures each allowing coolant bounded by said side wall to pass through said upper part of said lower tie plate,
    (c) a channel box surrounding said fuel rods and having a lower end in which said lower tie plate is received, whereby in use coolant after passing through said coolant apertures moves upwardly along said fuel rods within said channel box,
    wherein said coolant apertures in said lower tie plate include, adjacent the periphery of the lower tie plate, a plurality of peripheral apertures which each has, at a region of said upper face further from the axial centre line of the tie plate than the axial centre lines of the closest neighbouring fuel rods to the aperture, a width in the direction parallel to the periphery of the lower tie plate which is greater than any width of the apertures in said direction at the region directly between said closest neighbouring fuel rods.

5. Nuclear fuel assembly comprising:

(a) a plurality of fuel rods having upper and lower ends and extending generally parallel to each other, (b) a lower tie plate supporting said lower ends of said fuel rods and having an upper face and a plurality of coolant apertures extending through it and ending at said upper face, (c) a channel box surrounding said fuel rods and having a lower end in which said lower tie plate is received, whereby in use coolant after passing through said coolant apertures moves upwardly along said fuel rods within said channel box, there being a path for leakage flow between the channel box and said lower tie plate, wherein said lower tie plate has an upper plate portion supporting said fuel rods and providing said upper face and a side wall extending downwardly from the periphery of said upper plate portion and bounding a chamber for said coolant, said coolant apertures extending from said chamber to said upper face, and wherein said coolant apertures include, adjacent the periphery of the lower tie plate, a plurality of peripheral apertures which each is bounded by a boundary wall which, at least at said upper face, has a portion more remote from the axial centre line of said lower tie plate than the inner face of said side wall bounding said coolant chamber, said peripheral apertures each providing a velocity peak of coolant flow located further from the axial centre line of the lower tie plate than the axial centre lines of the closest neighbouring fuel rods to the aperture, said velocity peak being a peak in a diagram of coolant velocity distribution at the upper face of the lower tie plate along a line perpendicular to the direction of the periphery of the lower tie plate at the location of the aperture.

6. Nuclear fuel assembly comprising:

(a) a plurality of fuel rods having upper and lower ends and extending generally parallel to each other, (b) a lower tie plate supporting said lower ends of said fuel rods and having an upper face and a plurality of coolant apertures extending through it and ending at said upper face, (c) a channel box surrounding said fuel rods and having a lower end in which said lower tie plate is received, whereby in use coolant after passing through said coolant apertures moves upwardly along said fuel rods within said channel box, there being a path for leakage flow between the channel box and said lower tie plate, wherein said lower tie plate has an upper plate portion supporting said fuel rods and providing said upper face and a side wall extending downwardly from the periphery of said upper plate portion and bounding a chamber for said coolant, said coolant apertures extending from said chamber to said upper face, and wherein said coolant apertures include, adjacent the periphery of the lower tie plate, a plurality of peripheral apertures which each is bounded by a boundary wall which, at least at said upper face, has a portion which is spaced from the periphery of the lower tie plate by a distance which is less than the general thickness of said side wall bounding the coolant chamber, said peripheral apertures each providing a velocity peak of coolant flow located further from the axial centre line of the lower tie plate than the axial centre lines of the closest neighbouring fuel rods to the aperture, said velocity peak being a peak in a diagram of coolant velocity distribution at the upper face of the lower tie plate along a line perpendicular to the direction of the periphery of the lower tie plate at the location of the aperture.

7. Nuclear fuel assembly comprising:

(a) a plurality of fuel rods having upper and lower ends and extending generally parallel to each other, (b) a lower tie plate supporting said lower ends of said fuel rods and having an upper face, a plurality of fuel rod apertures in said upper face receiving said lower ends of said fuel rods and a plurality of coolant apertures extending through the lower tie plate and ending at said upper face, (c) a channel box surrounding said fuel rods and having a lower end in which said lower tie plate is received, whereby in use coolant after passing through said coolant apertures moves upwardly along said fuel rods within said channel box, there being a patch for leakage flow between the channel box and said lower tie plate, wherein said coolant apertures include a plurality of peripheral aperture which, as seen in plan view on said upper face, are at least partly located outside said fuel rod apertures receiving the lower ends of the outermost of said fuel rods, said peripheral apertures each providing a velocity peak of coolant flow located further from the axial centre line of the lower tie plate than the axial centre lines of the closest neighbouring fuel rods to the aperture, said velocity peak being a peak in a diagram of coolant velocity distribution at the upper face of the lower tie plate along a line perpendicular to the direction of the periphery of the lower tie plate at the location of the aperture.

8. Nuclear fuel assembly comprising:

(a) a plurality of fuel rods having upper and lower ends and extending generally parallel to each other, (b) a lower tie plate supporting said lower ends of said fuel rods and having an upper face and a plurality of coolant apertures extending through it and ending at said upper face, (c) a channel box surrounding said fuel rods and having a lower end in which said lower tie plate is received, whereby in use coolant after passing through said coolant apertures moves upwardly along said fuel rods within said channel box, wherein said coolant apertures comprise a plurality of first apertures distributed, as seen in plan view on said upper face, in a first area spaced from the periphery of the upper face, and a plurality of second apertures smaller in cross-section than said first apertures and distributed in a second area surrounded by said first area, the sizes and spacings of said first and second apertures being such that the open area ratio, as herein defined, of said first area is substantially larger than the open area ratio of said second area.

9. Nuclear fuel assembly according to claim 8 wherein said first and second apertures are of circular crosssection.

10. Nuclear fuel assembly according to claim 8, wherein said coolant apertures further include, adjacent the periphery of the lower tie plate, a plurality of peripheral apertures which each provide a velocity of peak of coolant flow located further from the axial centre line of the tie plate than the axial centre lines of the closest neighbouring fuel rods to the aperture, said velocity peak being a peak in a diagram of coolant velocity distribution at the upper face of the lower tie plate along a line perpendicular to the direction of the periphery of the lower tie plate at the location of the aperture.

11. Nuclear fuel assembly according to claim 10, wherein said tie plate has an upper plate portion supporting said fuel rods and providing said upper face and a side wall extending downwardly from the periphery of said upper plate portion and bounding a chamber for said coolant, said coolant apertures extending from said chamber to said upper face, said peripheral apertures being at least partly located within the thickness of said wall.

12. Nuclear fuel assembly according to claim 8, wherein said coolant apertures in said lower tie plate further include, adjacent the periphery of the lower tie plate, a plurality of peripheral apertures which each has, at a region of said upper face further from the axial centre line of the lower tie plate than the axial centre lines of the closest neighbouring fuel rods to the aperture, a width in the direction parallel to the periphery of the lower tie plate which is greater than any width of the aperture in said direction at the region directly between said closest neighbouring fuel rods.

13. Nuclear fuel assembly according to claim 8, wherein said lower tie plate has an upper plate portion supporting said fuel rods and providing said upper face and a side wall extending downwardly from the periphery of said upper plate portion and bounding a chamber for said coolant said coolant apertures extending from said chamber to said upper face, and wherein said coolant apertures further include, adjacent the periphery of the lower tie plate, a plurality of peripheral apertures which each is bounded by a boundary wall which, at least said upper face, has a portion more remote from the axial centre line of said lower tie plate than the inner face of said side wall bounding said coolant chamber.

14. Nuclear fuel assembly according to claim 8, wherein said lower tie plate has an upper plate portion supporting said fuel rods and providing said upper face and a side wall extending downwardly from the periphery of said upper plate portion and bounding a chamber for said coolant, said coolant apertures extending from said chamber to said upper face, and wherein said coolant apertures further include, adjacent the periphery of the lower tie plate, a plurality of peripheral apertures which each is bounded by a boundary wall which, at least at said upper face, has a portion which is spaced from the periphery of the lower tie plate by a distance which is less than the general thickness of said side wall bounding the coolant chamber.

15. Nuclear fuel assembly according to claim 8, wherein said coolant apertures include a plurality of peripheral apertures which, as seem in plan view on said upper face, are at least partly located outside fuel rod apertures in said upper face receiving the lower ends of the outermost of said fuel rod.

* * * * *